United States Patent
Bianchi et al.

(10) Patent No.: US 10,110,489 B2
(45) Date of Patent: Oct. 23, 2018

(54) METHOD OF HANDLING DATA PACKETS THROUGH A STATE TRANSITION TABLE AND APPARATUS USING THE SAME

(71) Applicants: Giuseppe Bianchi, Rome (IT); Antonio Capone, Milan (IT); Marco Bonola, Rome (IT); Carmelo Cascone, Ragusa (IT)

(72) Inventors: Giuseppe Bianchi, Rome (IT); Antonio Capone, Milan (IT); Marco Bonola, Rome (IT); Carmelo Cascone, Ragusa (IT)

( * ) Notice: Subject to any disclaimer, the term of this patent is extended or adjusted under 35 U.S.C. 154(b) by 0 days.

(21) Appl. No.: 15/124,779

(22) PCT Filed: Mar. 10, 2015

(86) PCT No.: PCT/IB2015/051725
§ 371 (c)(1),
(2) Date: Oct. 18, 2016

(87) PCT Pub. No.: WO2015/136432
PCT Pub. Date: Sep. 17, 2015

(65) Prior Publication Data
US 2017/0317930 A1    Nov. 2, 2017

(30) Foreign Application Priority Data
Mar. 12, 2014  (IT) .............................. CO2014A0005

(51) Int. Cl.
*H04L 12/741* (2013.01)
*H04L 12/771* (2013.01)
*H04L 12/715* (2013.01)

(52) U.S. Cl.
CPC ............ *H04L 45/745* (2013.01); *H04L 45/56* (2013.01); *H04L 45/64* (2013.01)

(58) Field of Classification Search
CPC ... H04L 12/56; H04L 2012/56; H04L 49/254; H04L 49/255; H04L 12/5601;
(Continued)

(56) References Cited

U.S. PATENT DOCUMENTS

| 6,115,775 A * | 9/2000 | Ross ..................... G06F 13/128 710/260 |
| 6,526,066 B1 * | 2/2003 | Weaver ................... H04L 47/10 370/429 |

(Continued)

OTHER PUBLICATIONS

H. Kim et al.: "Simpler Network Configuration with State-based Network Policies.", Georgia Institute of Technology. College of Computing; SCS technical report: GT-CS-13-04, Jul. 10, 2013 (Jul. 10, 2013), pp. 1-13, XP002731945, Retrieved from the Internet: URL: http://hdl.handle.net/183/49181 (retrieved on Sep. 8, 2016), see sections 3 and 4.

*Primary Examiner* — Brenda H Pham

(57) ABSTRACT

The apparatus (SW) has a plurality of input/output ports (P1, P2, P3, P4, P5) for receiving and transmitting data packets, and comprises a data packets handling circuitry (DPL) arranged to forward data packets between the input/output ports (P1, P2, P3, P4, P5) and an internal apparatus controller (CPL) arranged to control the data packet handling circuitry (DPL); the apparatus (SW) has a control port (PC) for communication between the internal apparatus controller (CPL) and an external network controller (NWC); the apparatus controller (CPL) is arranged to store (MEM) at least one state transition table (TT) to be used for controlling the forwarding of data packets by the data packets handling circuitry (DPL); the apparatus controller (DPL) is arranged to use said at least one state transition table (TT) for implementing at least one finite state machine (FSM); the apparatus controller (DPL) is arranged to use said at least one state transition table (TT) for handling separately dis-
(Continued)

tinct incoming data packets flows through corresponding distinct instances of finite state machine; the apparatus controller (DPL) is arranged to receive said at least one state transition table (TT) through the control port (PC).

18 Claims, 5 Drawing Sheets

(58) Field of Classification Search
CPC .......... H04L 2012/5609; H04L 49/256; H04L 49/1553; H04Q 11/0407; H04Q 2213/13003; H04Q 11/0428; H04Q 11/0471
USPC ............... 370/389, 360, 359, 396, 397, 399, 370/395.31, 395.32
See application file for complete search history.

(56) References Cited

U.S. PATENT DOCUMENTS

| | | | |
|---|---|---|---|
| 7,424,016 B2* | 9/2008 | Sweeney | ................. H04L 45/00 370/389 |
| 2002/0129208 A1* | 9/2002 | Barroso | .............. G06F 12/0826 711/141 |
| 2009/0103990 A1* | 4/2009 | Koch | ...................... B23B 51/02 407/33 |
| 2012/0284222 A1* | 11/2012 | Atasu | ................. H04L 63/1408 706/48 |

* cited by examiner

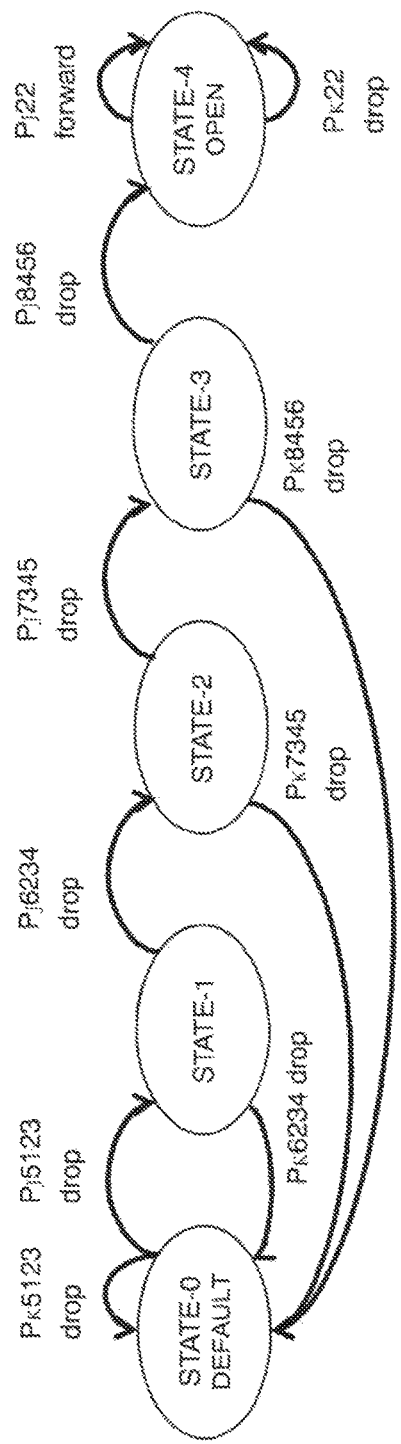
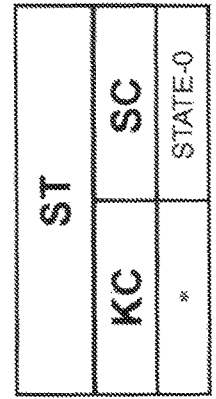
Fig. 4A
Fig. 4B
Fig. 4C

| FT | | | |
|---|---|---|---|
| SC | EC | UC | AC |
| STATE-0 | P1 | STATE-1 | flood |
| STATE-1 | P1 | STATE-1 | forward(P1) |
| STATE-2 | P1 | STATE-1 | forward(P2) |
| STATE-3 | P1 | STATE-1 | forward(P3) |
| STATE-4 | P1 | STATE-1 | forward(P4) |
| STATE-5 | P1 | STATE-1 | forward(P5) |
| STATE-0 | P2 | STATE-2 | flood |
| STATE-1 | P2 | STATE-2 | forward(P1) |
| STATE-2 | P2 | STATE-2 | forward(P2) |
| STATE-3 | P2 | STATE-2 | forward(P3) |
| STATE-4 | P2 | STATE-2 | forward(P4) |
| STATE-5 | P2 | STATE-2 | forward(P5) |
| STATE-0 | P3 | STATE-3 | flood |
| STATE-1 | P3 | STATE-3 | forward(P1) |
| STATE-2 | P3 | STATE-3 | forward(P2) |
| STATE-3 | P3 | STATE-3 | forward(P3) |
| STATE-4 | P3 | STATE-3 | forward(P4) |
| STATE-5 | P3 | STATE-3 | forward(P5) |
| STATE-0 | P4 | STATE-4 | flood |
| STATE-1 | P4 | STATE-4 | forward(P1) |
| STATE-2 | P4 | STATE-4 | forward(P2) |
| STATE-3 | P4 | STATE-4 | forward(P3) |
| STATE-4 | P4 | STATE-4 | forward(P4) |
| STATE-5 | P4 | STATE-4 | forward(P5) |
| STATE-0 | P5 | STATE-5 | flood |
| STATE-1 | P5 | STATE-5 | forward(P1) |
| STATE-2 | P5 | STATE-5 | forward(P2) |
| STATE-3 | P5 | STATE-5 | forward(P3) |
| STATE-4 | P5 | STATE-5 | forward(P4) |
| STATE-5 | P5 | STATE-5 | forward(P5) |

Fig. 5A

| ST | |
|---|---|
| KC | SC |
| * | STATE-0 |

Fig. 5B

METHOD OF HANDLING DATA PACKETS THROUGH A STATE TRANSITION TABLE AND APPARATUS USING THE SAME

CROSS REFERENCE TO RELATED APPLICATIONS

This is a National Stage of International Application No. PCT/IB2015/051725, filed Mar. 10, 2015, which claims the priority of Italian Application No. CO2014A000005, filed Mar. 12, 2014, the entire disclosures of which are hereby incorporated by reference in their entirety.

FIELD OF THE INVENTION

The present invention relates to a method of handling data packets (for example IP packets, Ethernet packets, Ethernet frames, . . . ) and to an apparatus using the same.

In particular, the present invention is advantageously applied in those network switching apparatuses generally called "switches" and concentrates on how to forward data packets between the their input/output ports. Nowadays, the word "switch" may refer to an apparatus operating at Layer 2 or Layer 3 or Layer 4 of the OSI model; in the past, the word "switch" was limited to an apparatus operating at Layer 2 and the word "router" was limited to an apparatus operating at Layer 3.

BACKGROUND OF THE INVENTION

Just a few years ago it was normal to configure network apparatuses using proprietary interfaces, differing across vendors, apparatus types (switches, routers, firewalls, load balancers, etc.), and even different firmware releases for a same apparatus. Managing heterogeneous multivendor networks of non-marginal scale was (and still is) extremely difficult, and required (and still requires) a huge expertise.

"OpenFlow" emerged very recently, i.e. in 2008, as an attempt to change this situation. OpenFlow's breakthrough was the identification of a vendor-agnostic programming abstraction for configuring the forwarding behavior of network switching apparatus. Via the OpenFlow Application Programming Interface, in short "API", network administrators can remotely reconfigure at runtime forwarding tables, probe for flow statistics, and redirect packets not matching any local flow entry towards a network controller for further analysis/processing and for taking relevant decisions; in essence "program" the network from a central control point, clearly separated from the forwarding level.

Today, such vision is called Software Defined Networking, in short "SDN".

OpenFlow turned to be immediately deployable, thanks to its pragmatic balance between open network programmability and real world vendors' and deployers' needs. Starting from the recognition that several different network devices implement somewhat similar flow tables for a broad range of networking functionalities (L2/L3 forwarding, firewall, NAT, etc.), the authors of OpenFlow proposed an abstract model of a programmable flow table which was amenable to high-performance and low-cost implementations; capable of supporting a broad range of research; and consistent with vendors' need for closed platforms.

Via the OpenFlow "match/action" abstraction, the device programmer can broadly specify a flow via an header matching rule, associate forwarding/processing actions to the matching packets, and access bytes/packet statistics associated to the specified flow.

Almost six years have now passed since the OpenFlow inception, and the latest OpenFlow standard, now at version 1.4, appears way more complex than the initial elegant and simple concept. To fit the real world needs, a huge number of extension (not only the initially foreseen functional ones, such as supplementary actions or more flexible header matching, but also structural ones such as action bundles, multiple pipelined tables, synchronized tables, and many more) were promoted in the course of the standardization process. And new extensions are currently under discussion for the next OpenFlow version.

All this hectic work was not accompanied by any substantial rethinking in the original programmatic abstraction (besides the abandoned Google OpenFlow 2.0 proposal, considered too ambitious and futuristic), so as to properly capture the emerging extensions, simplify their handling, and prevent the emergence of brittle, platform-specific, implementations which may ultimately threaten the original vendor-independency goal of the OpenFlow inventors.

SUMMARY OF THE INVENTION

Even if an OpenFlow apparatus may now be rich of functionalities and primitives, it remains completely "dumb", with all the "smartness" placed at the central network controller side.

From the article "Simpler Network Configuration with State-based Network Policies" by H. Kim et al. of the Georgia Institute of Technology, College of Computing SCS technical report, there is know a solution based on OpenFlow; according to this solution, the network forwarding apparatuses (see switches in FIG. 1) are traditional OpenFlow switches, i.e. "dumb", and all the "smartness" is placed inside a central network controller called "PyResonance controller" (see upper part of FIG. 1 and corresponding explanation in paragraph 2.1). The network forwarding apparatuses (that may be called simply "apparatuses") according to this solution comprises, as always, an internal data packets handling circuitry and an internal apparatus controller. The "smartness" is implemented inside the central network controller using a programming abstraction based on traditional Finite State Machines, in short "FSM".

Recently and despite OpenFlow's data plane programmability, the need to use advanced packet handling for important network services has lead to the proliferation of many types of specialized "middle-boxes". The extension of programmability and exibility features to these advanced network functions is a crucial aspect, and a recent trend is that of virtualizing them in data centers on general purpose hardware platforms and to make them programmable and configurable using SDN approaches.

The present Inventors wanted to follow the OpenFlow approach (avoiding "middle-boxes" and "virtualization"), i.e. network management control should be (logically) centralized; in other words, they wanted to keep the control plane and the data plane separate according to the spirit of SDN.

However the present Inventors posit that several statefull tasks, just involving local states inside single links/switches are unnecessarily centralized according to OpenFlow and not deployed to the local apparatuses. As a result, the explicit involvement of the controller for any statefull processing and for any update of the match/action rules, is problematic. In the best case, this leads to extra signaling load and processing delay, and calls for a capillary distributed implementation of the "logically" centralized controller. In the worst case, the very slow control plane operation a priori prevents the support of network control algorithms which require prompt, real time, reconfiguration in the data plane forwarding behavior.

In essence, dumbness in the data forwarding plane appears to be a by-product of the limited capability of the OpenFlow data plane API—Application Programming Interface, rather than an actual design choice or an SDN postulate.

Therefore, the present Inventors thought of a better data plane API—Application Programming Interface which would permit to program some level of smartness directly inside the forwarding apparatuses.

The present Inventors thought that a major shortcoming of OpenFlow is its inability to permit the programmer to deploy states inside the forwarding apparatus.

However, adding states to OpenFlow was considered not sufficient: the programmer should be entitled to formally specify how states should be handled, and this specification should be executed inside the apparatus with no further interaction with the controller.

Furthermore, they considered that an effective solution should have come along with two attributes: (1) be amenable to high speed implementation, (2) not violate the vendor-agnostic principle which has driven the OpenFlow invention, and which has fostered SDN; in essence, an effective solution should be a concrete and pragmatic "abstraction", rather than a theoretical approach.

The present inventors proposes of a viable abstraction to formally describe a desired statefull processing of flows inside the network forwarding apparatus, without requiring the apparatus to be open source or to expose its internal design. Such abstraction relies on Finite State Machines, in short "FSM", in particular eXtended Finite State Machines, in short "XFSM".

Extending the OpenFlow abstraction through the use of FSM, in particular XFSM, allows to offload on high performance switches a pretty large set of functions reducing the need to rely on controllers and middle-boxes.

According to the present invention, inclusion of flow states is not limited to the functionality of the apparatus, i.e. its packets handling capabilities, but it takes into account the API—Application Programming Interface.

Advantageously, extending the OpenFlow abstraction through the use of FSM is not disruptive, i.e. it is in line with traditional Open Flow, and therefore it would be relatively easy to be introduced into existing networks and used by current network operators.

The present Inventors are aware that XFSMs have already been proposed in the field of network apparatuses; anyway, this was done for a completely different application, i.e. in order to convey a desired medium access control operation into a wireless interface card; therefore, the old application and the new application are not related and comparable.

The present invention is defined by the appended claims.

A first aspect of the present invention is a (network forwarding) apparatus having a plurality of input/output ports for receiving and transmitting data packets, and comprising a data packets handling circuitry arranged to forward data packets between the input/output ports and an internal apparatus controller arranged to control said data packet handling circuitry; the apparatus has a control port for communication between the internal apparatus controller and an external network controller; the apparatus controller is arranged to store at least one state transition table to be used for controlling the forwarding of data packets by the data packets handling circuitry; the apparatus controller is arranged to use said at least one state transition table for implementing at least one finite state machine; the apparatus controller is arranged to use said at least one state transition table for handling separately distinct incoming data packets flows through corresponding distinct instances of finite state machine; the apparatus controller is arranged to receive said at least one state transition table through the control port.

The data packets may be for example IP packets, Ethernet packets, Ethernet frames, . . . ; it is not to be excluded that such apparatus would be arranged to handle different kinds of data packets.

The apparatus may operate at Layer 2 or Layer 3 or Layer 4 of the OSI model; it is not to be excluded that such apparatus would be arranged to operate different layers.

The control port may be a port dedicated to the communication with the external network controller or may be any of the input/output ports; in the second case, control information from/to the external network controller are transported, at least partially, by the network transporting data packets.

It is possible that the apparatus stores multiple tables for implementing multiple (different) finite state machines in order to carry out multiple (different) handling strategies in parallel and/or in series particularly in this case, it is likely that the apparatus comprises internal queues for storing data packets between a handling strategy and the following handling strategy and that data packets are forwarded from an input/output port to and internal queue or from one internal queue to another internal queue or from one internal queue to an input/output port. This possibility, is not to be confused with multiple instances of the same finite state machine. In fact, in general, a network forwarding apparatus has to handle a plurality of incoming data packets flows according to the same strategy and each flow may be in a different state; this is implemented "conceptually" through a plurality of instances of the same finite state machine.

In the above-defined solution, the architecture of the apparatus controller is not specified; it is only important that it is able to receive a table from the external network controller and interpret it as a state transition table of a finite state machine; this means that the above-defined solution is hardware independent.

Receiving a table may mean: receiving the definition of the table structure and its data content, or receiving only its data content and the table structure is already known to both the external controller and the internal controller.

It is to be noted that, even if such apparatus is able to carry out statefull processing of data packets flows, it is also able to carry out stateless processing of data packets flows (for example simple routing through a routing table); in fact, a stateless processing may be considered a statefull processing based on only one state.

According to a preferred embodiment, said at least one state transition table corresponds to the combination of a state table and a flow table, the apparatus controller is arranged to store the state table and the flow table, the apparatus controller is arranged to receive the flow table through the control port, and optionally the apparatus controller is arranged to receive the state table through the control port.

According to this very advantageous embodiment, the heart of the finite state machine is the flow table and need to be received from the external controller before the apparatus starts handling data packets accordingly. Depending on the implementation of this embodiment, the data content of the state table may be completely built by the internal controller or, alternatively, some data content may be received from the external controller before the apparatus starts handling data packets according to the corresponding flow table. It is important to consider that the structure of the state table and the structure of the flow table are linked to each other as they constitute a state transition table.

According to a preferred embodiment, the state table comprises a key column and a state column, and the apparatus controller is arranged to determine through the state table state data based on data in incoming data packets, and the flow table comprises a state column, an event column, an action column and an update column, and the apparatus controller is arranged to determine through the flow table action information and update information based on information on events occurring at the input/output ports and on state data determined through the state table, the action information relating to forwarding actions to be performed on incoming data packets, the update information relating to row updates to be performed on data in the state table.

The typical forwarding actions are: drop a data packet, flood a data packet to all the ports of the apparatus (this is done for example in case of broadcast traffic or in case that the correct forwarding path is not known to the apparatus) and forward the data packet to one port of the apparatus (this is done for example in case of unicast traffic) or more ports (this is done for example in case of multicast traffic) of the apparatus; other actions are not to be excluded for example those already typical in OpenFlow and OpenFlow apparatuses such as "header-rewrite", "rate-limit", . . . .

Updating the state table during operation of the apparatus means updating the current state of the finite state machine, precisely the current state of an instance of the finite state machine.

It is to be noted that, in general, each cell of the tables, in particular each cell of the flow, table, may store one or more piece of information; this is particularly true for the action information and the update information; in fact, one or more forwarding actions may be provided and/or one or more updating actions may be provided. It may be possible that the forwarding actions and/or the updating actions be subject to conditions specified in the cells of the flow table.

According to a preferred embodiment, the apparatus controller is arranged to use said at least one state transition table for handling separately distinct incoming data packets flows through corresponding distinct instances of finite state machine, and the apparatus controller is arranged to handle distinct incoming data packets flows independently or dependently from each other through relations between instances of finite state machine.

According to this very advantageous embodiment, an event and packet relating to a first incoming data packets flow may trigger a state transition in the instance of finite state machine relating to the first flow or in the instance of finite state machine relating to a second flow; it is also possible that an event and packet may trigger multiple state transitions. This means that there may be a relation between instances of finite state machines.

According to a preferred embodiment, the update information relates to the same instance of finite state machine or to a different instance of finite state machine. This is a way to implement the above-mentioned relation.

According to a preferred embodiment, the apparatus controller is arranged to implement at least one key extraction function.

According to a preferred embodiment, the apparatus controller is arranged to apply a first key extraction function to data in incoming data packets for the purpose of querying the state table.

According to a preferred embodiment, the apparatus controller is arranged to apply a second key extraction function to data in incoming data packets for the purpose of updating the state table.

According to a preferred embodiment, the apparatus controller is arranged to receive one or two key extraction rules through the control port to be used for the key extraction function or functions.

The optional features of the invention relating to key extraction will be clearer from the detailed description.

A second aspect of the present invention is a method of handling data packets in an apparatus having a plurality of input/output ports for receiving and transmitting data packets; according to a specific embodiment, the method comprises the steps:

A) receiving an data packet at a first one of the plurality of input/output ports, B) determining state data based on data in the data packets by looking into a state table, C) determining action information and update information based on information on an event corresponding to step A and on the state data determined at step B by looking into a flow table, D) forwarding the data packet to no input/output ports or to at least a second one of the plurality of input/output ports according to the action information determined at step C, E) updating the state table according to the update information determined at step C, and F) typically transmitting the data packet in accordance to the result of step D.

The data packets may be for example IP packets, Ethernet packets, Ethernet frames, . . . ; it is not to be excluded that such apparatus would be arranged to handle different kinds of data packets.

Handling may be at Layer 2 or Layer 3 or Layer 4 of the OSI model.

It is to be noted that forwarding the forwarding of step D may involve queues internal to the apparatus.

The flow table and possibly the state table may be received from a network controller.

It is to be noted that, in general, a method of handling data packets in an network forwarding apparatus may operate through a state transition table corresponding to a finite state machine; such a finite state machine may be considered a particular kind of extended finite state machine.

BRIEF DESCRIPTION OF THE DRAWINGS

The present invention will be described in the following with the aid of annexed drawings wherein:

FIG. 4 shows a state diagram and two tables relating to a first example of application of the present invention, and FIG. 5 shows two tables relating to a second example of application of the present invention.

Such description and such drawings are not to be considered as limiting the present invention that is only defined by the annexed claims; in fact, it will clear to one skilled in the art that the embodiments described in the following may be subject to modifications and variants in their details and that alternative embodiments are possible.

DETAILED DESCRIPTION OF THE INVENTION

Figure 1:
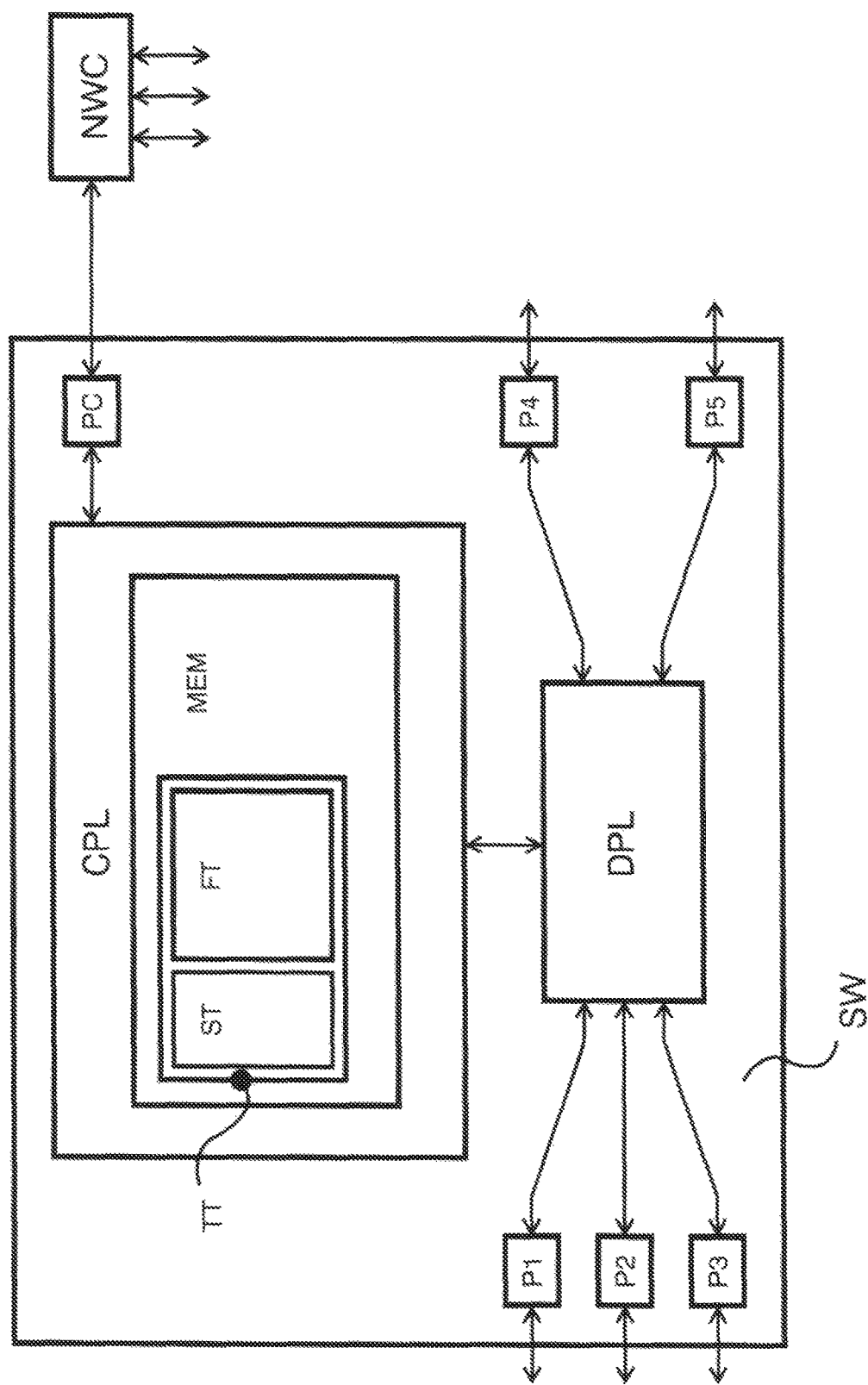
FIG. 1 shows a simplified block diagram of an embodiment of an apparatus according to the present invention.

The network forwarding apparatus SW of the embodiment of FIG. 1, that may be called a "switch", has five input/output ports P1, P2, P3, P4, P5 for receiving and transmitting IP packets, and comprises two basic building blocks: an IP packets handling circuitry DPL, a so-called "data plane", and an internal apparatus controller CPL, a so-called "control plane"; circuitry DPL is arranged to forward IP packets between the input/output ports P1, P2, P3, P4, P5; the internal controller CPL is arranged to control circuitry DPL. Apparatus SW has also a control port PC for communication between the internal apparatus controller CPL and an external network controller NWC; external controller NWC is arranged to control not only apparatus SW, but also many other similar network apparatuses.

Controller CPL comprises a memory MEM that is designed to store at least one state transition table TT to be used by the controller CPL for controlling the forwarding of IP packets by circuitry DPL; controller CPL is arranged to use the state transition table TT for implementing at least one finite state machine FSM and for handling separately distinct incoming IP packets flows through corresponding distinct instances of finite state machine. From the theoretical point of view, the transition table TT might be considered part of the "data plane"; in this case, the controller CPL would manage the transition table TT as an external component.

In the embodiment of FIG. 1, state transition table TT corresponds to the combination of a state table ST and a flow table FT. Apparatus internal controller CPL is arranged to receive transition table TT through the control port PC from the network external controller NWC; in particular, it receives flow table FT with full data content and state table ST with some initial data content; during operation of apparatus SW, data content is built and partially added and partially replaced to the initial data content of state table ST.

Figure 2:
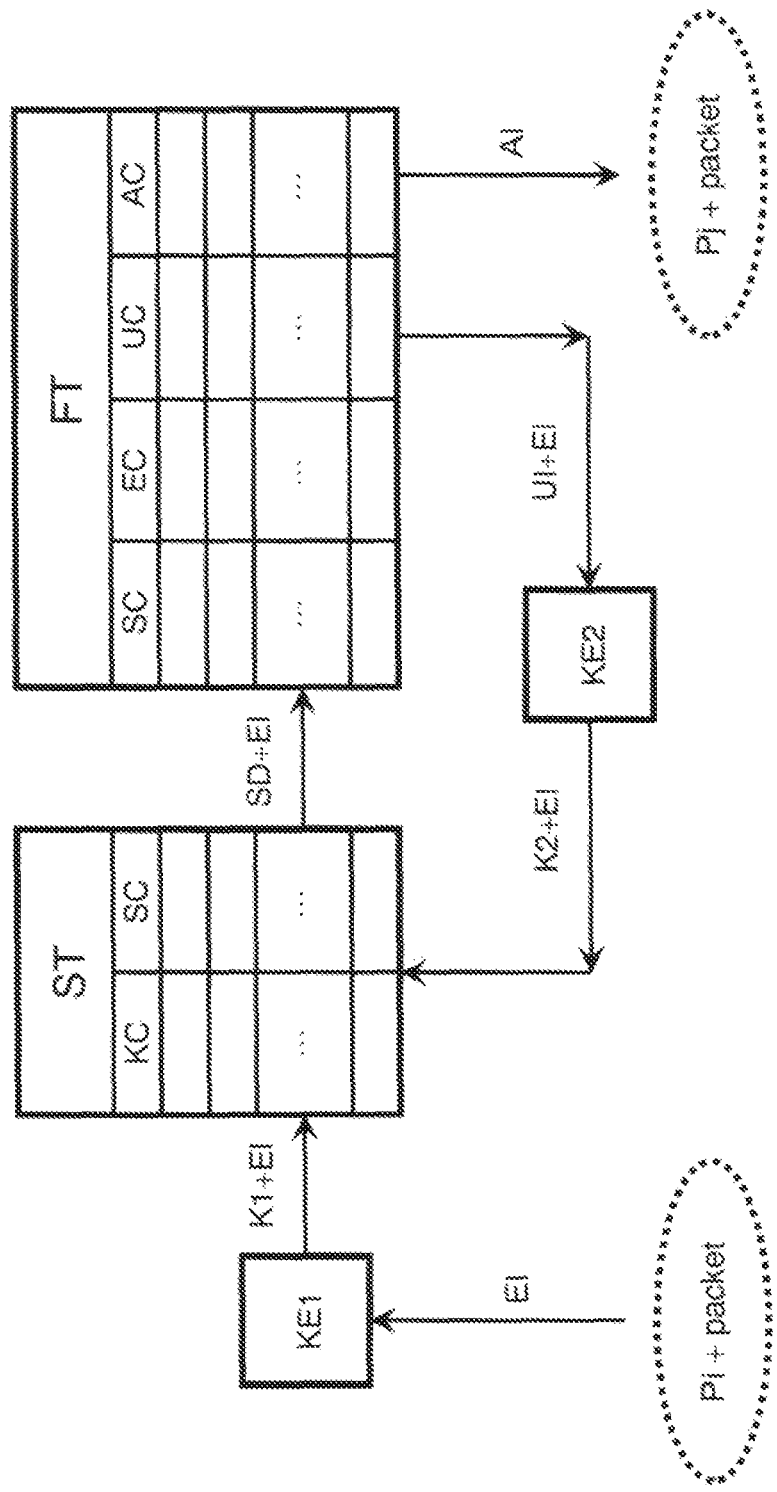
FIG. 2 shows schematically the use of a state table and a flow table according to an embodiment of a method according to the present invention.

FIG. 2 shows the state table ST and the flow table FT; the state table FT comprises a key column KC and a state column SC; the flow table FT comprises a state column SC, an event column EC, an action column AC and an update column UC.

FIG. 2 shows also a first key extraction function KE1 that uses first key information (corresponding to a first key extraction rule) for key extraction, and a second key extraction function KE2 that uses second key information (corresponding to a second key extraction rule) for key extraction.

In general, data relating to the tables ST and FT and the functions KE1 and KE2, if used, are received from the network external controller NWC during configuration of the apparatus SW.

Event information EI is provided by the data plane DPL to the control plane CPL for each IP packet received by the apparatus SW; typically, event information EI consists in the packet header of the received IP packet and the port number Pi of the i/o port where the IP packet has been received.

Action information AI is provided by the control plane CPL to the data plane DPL for each IP packet received by the apparatus SW; typically, action information AI consists in the packet header of the received IP packet and the port number Pj of the i/o port where the IP packet has to be forwarded and then, typically, transmitted.

The first key extraction function KE1 extracts key data K1 from the packet header. Key data K1 are used to query the state table ST.

The result of the state table query is state data SD.

State data SD and event information EI (the port number Pi, or selected data in the packet header, or port number Pi and selected data in the packet header) are used to query flow table. Usually, not the whole event information EI is used for the query, but any combination of switch port number, source MAC address, destination MAC address, source IP address, destination IP address, source TCP port, destination TCP port, and even Wireless LAN ID, IP protocol, Ethernet type. Matching for the purpose of querying the flow table FT is based on the state column SC (in relation to the stated data) and the event column EC (in relation to the event information).

The result of flow table query is update information UI and action information AI.

The second key extraction function KE2 extracts key data K2 from the packet header.

Key data K2 and event information EI are used to update the state table ST.

Figure 3:
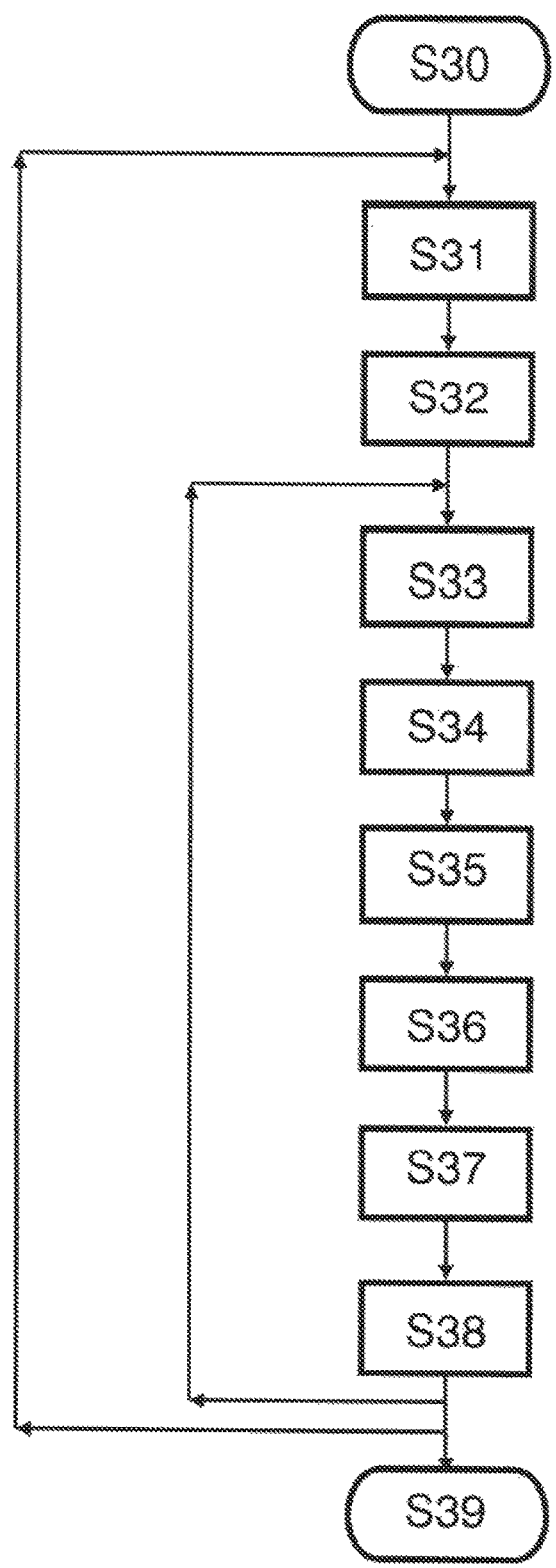
FIG. 3 shows a flow chart of an embodiment of a method according to the present invention.

The processing shown by the flow chart of FIG. 3 refers to the element shown in FIG. 2; it has a start S30 and a stop S39, and comprises the following steps:

S31: receiving the flow table FT (structure and full data) at control port PC from network controller NWC (configuration of apparatus SW), S32: receiving the state table ST (structure and some data) at control port PC from network controller NWC (configuration from apparatus SW), S33: receiving an IP packet at a first one port Pi of the plurality of input/output ports P1, P2, P3, P4, P5, S34: determining state data SD based on data in the IP packets by looking into the state the table ST, S35: determining action information AI and update information UI based on information on an event corresponding to step S33 and on the state data SD determined at step S34 by looking into the flow table FT, S36: forwarding the IP packet to no input/output ports or to at least a second one port Pj of the plurality of input/output ports P1, P2, P3, P4, P5 according to the action information AI determined at step S35, S37: updating the state table ST according to the update information UI determined at step S35, S38: transmitting the IP packet in accordance to the result of step S36.

The processing shown by the flow chart of FIG. 3 is repeated from step S33 to S38 for any new IP packets received by input/output ports P1, P2, P3, P4, P5 of apparatus SW.

Steps S31 and S32 may be repeated in case of reconfiguration of apparatus SW by network controller NWC.

First Example of Application—"Port Knocking"

The example that will described in the following with the aid of FIG. 4 relates to the opening of a data link between nodes of a network if such opening is subject to a preliminary "port knocking" phase.

According to this example, a source node may send data to a destination node only through TCP port #22 and the preliminary "port knocking" sequence corresponds to #5123, #6234, #7345, #8456. In other words, if a first node wants to send data packets to another node, at first the first node must send an IP packet wherein TCPdport (i.e. "TCP destination port")=#5123, then the first node must send an IP packet wherein TCPdport=#6234, then the first node must send an IP packet wherein TCPdport=#7345, finally the first node must send an IP packet wherein TCPdport=#8456; afterwards, the first node may send IP packets carrying data to another node but specifying TCPdport=#22.

Therefore, according to this example, IP packets flows are identified by the IP address of the source node.

For the sake of simplicity, this example considers only the opening of a data link between nodes of a network and does not consider the subsequent closing of the data link.

The state diagram of the procedure of this example is shown in FIG. 4A; it comprises five states labeled: "STATE-0", "STATE-1", "STATE-2", "STATE-3", "STATE-4"; "STATE-0" is considered the "DEFAULT" state (the data link is closed) and "STATE-4" is considered the "OPEN" state (the data link is open).

FIG. 4B shows a flow table FT that is used for implementing the procedure of this example according to the present invention; such flow table is stored into the control plane CPL of the apparatus SW during configuration of the apparatus SW by the network controller NWC.

FIG. 4C shows a state table ST that is used for implementing the procedure of this example according to the present invention as it is at the beginning, i.e. just after configuration of the apparatus SW by the network controller NWC; according to this example, such state table is stored into the control plane CPL of the apparatus SW during configuration of the apparatus SW by the network controller NWC.

At the beginning, an IP packet is received at an i/o port of the apparatus SW; this is an event, i.e. the first event.

Event information EI is provided by the data plane DPL to the control plane CPL; event information EI consists in the packet header of the received IP packet and the port number Pi of the i/o port where the IP packet has been received.

The activities described in the following occur within the control plane CPL.

Key data K1 are extracted from the packet header based on first key information and used to query the state table ST; in this example, the first key information specifies that key data to be extracted from the header of the received IP correspond to IPsrc (i.e. "source IP address").

For example, the key data K1 of the currently handled IP packet is "1.10.100.1".

At the beginning, the state table ST contains, for example and as shown in FIG. 4C, only the following row:

| KC | SC |
|----|----|
| *  | STATE-0 | wherein "*" is symbol of data that match with any key data.

The state table ST is scanned from top to bottom in order to find the first row that matches with the key data extracted from the just received IP packet. The result of the query, i.e. state data SD, is "STATE-0" as there is only one row and as "*" matches with "1.10.100.1".

State data SD are used to query the flow table FT.

Event data ED are extracted from the event information EI and are used to query the flow table FT; in this example, the event data ED is the TCPdport (i.e. "TCP destination port") in the header of the received IP packet.

Thus the flow table FT is queried through the state data SD and the event data ED, i.e. it is scanned from top to bottom in order to find the first row that matches with the state data SD and the event data ED.

At this point, data SD="STATE-0".

If the TCPdport in the currently handled IP packet is different from 5123, i.e. ED is different from 5123, a match occurs only with the last row of the flow table FT. The result of the query, the action information AI is "drop" and the update information UI is "STATE-0".

Based on the action information AI (that is provided by the control plane CPL to the data plane DPL), the received IP packet is dropped.

Based on the update information UI the state table ST is updated.

In order to carry out the updating, key data K2 are extracted from the packet header based on second key information; in this example, the second key information specifies that key data to be extracted from the header of the received IP correspond to IPsrc (i.e. "source IP address"); it is to be noted that, according to this example, the first key information and the second key information coincide and therefore the key data K1 and key data K2 are identical. In this case, the key data K2 of the currently handled IP packet is "1.10.100.1".

At this stage a row is added to the state table ST using key data K2, i.e. "1.10.100.1", and update information UI, "STATE-0", see below.

| KC | SC |
|----|----|
| 1.10.100.1 | STATE-0 |
| * | STATE-0 |

If the TCPdport in the currently handled IP packet is equal to 5123, i.e. ED is equal to 5123, a match occurs with the first row of the flow table FT. The result of the query, the action information AI is "drop" and the update information UI is "STATE-1".

Based on the action information AI (that is provided by the control plane CPL to the data plane DPL), the received IP packet is dropped.

Based on the update information UI the state table ST is updated.

In order to carry out the updating, key data K2 are extracted from the packet header based on second key information; in this example, the second key information specifies that key data to be extracted from the header of the received IP correspond to IPsrc (i.e. "source IP address"); it is to be noted that, according to this example, the first key information and the second key information coincide and therefore the key data K1 and key data K2 are identical. In this case, the key data K2 of the currently handled IP packet is "1.10.100.1".

At this stage a row is added to the state table ST using key data K2, i.e. "1.10.100.1", and update information UI, "STATE-1", see below.

| KC | SC |
|----|----|
| 1.10.100.1 | STATE-1 |
| * | STATE-0 |

Considering now a further IP packet received, for example, from node "1.10.100.1" and wherein the TCPdport is equal to 6234.

ED is equal to 6234 and a match occurs with the second row of the flow table FT. The result of the query, the action information AI is "drop" and the update information UI is "STATE-2".

Based on the action information AI (that is provided by the control plane CPL to the data plane DPL), the received IP packet is dropped.

Based on the update information UI the state table ST is updated.

In order to carry out the updating, the key data K2 are extracted from the packet header based on the second key information; in this case, the key data K2 of the currently handled IP packet is "1.10.100.1".

At this stage a row is updated to the state table ST using key data K2, i.e. "1.10.100.1", and update information UI, "STATE-2", see below, as there is already a row in state table ST wherein the key data in the key column KC is equal to the key data extracted from the handled IP packet.

| KC | SC |
|---|---|
| 1.10.100.1 | STATE-2 |
| * | STATE-0 |

At this point other received IP packets are handled in the same way as described above.

After handling a certain number of received IP packets, the state table ST may be, for example as below.

| KC | SC |
|---|---|
| 1.10.100.1 | STATE-2 |
| 1.10.100.2 | STATE-0 |
| 1.10.200.5 | STATE-0 |
| 1.20.500.8 | STATE-0 |
| 1.10.100.3 | STATE-4 |
| * | STATE-0 | data link from node 1.10.100.1 is on the way to be opened
data link from node 1.10.100.2 is closed
data link from node 1.10.200.5 is closed
data link from node 1.20.500.8 is closed
data link from node 1.10.100.3 is open Till now, five IP packets flows have been handled with: one from node 1.10.100.1, one from node 1.10.100.2, one from node 1.10.100.3, one from node 1.10.200.5, and one from node 1.20.500.8.

It is apparent that each IP packets flow is dealt with independently. In practice, through the combination of the state table ST and the flow table FT a plurality of distinct instances of finite state machine is implemented; in particular, the heart of the finite state machine is the flow table while the state table allows to have a plurality of instances.

Considering now a further IP packet received, for example, from node "1.10.100.3".

If the TCPdport in this IP packet is equal to 22, i.e. ED is equal to 22, a match occurs with the fifth row of the flow table FT. The result of the query, the action information AI is "forward" and the update information UI is "STATE-4".

Based on the action information AI (that is provided by the control plane CPL to the data plane DPL), the received IP packet is forwarded.

Based on the update information UI the state table ST should be updated. Anyway, there is already a row wherein the key is "1.10.100.3" and the state is "STATE-4"; therefore, there is nothing to add or update.

The handling of further IP packets follow in the same way as described above.

According to the above description, tables ST and FT are scanned from top to bottom in order to find a match; anyway, it is to be understood that the matching priority may be determined in different ways (see for example OpenFlow).

Second Example of Application—"Mac Learning"

The example that will described in the following with the aid of FIG. 5 relates to the forwarding of Ethernet frames by the switch SW based on MAC address of the destination node of the incoming Ethernet frames.

In order to carry out a good performance, the switch SW must decide, for each of the received Ethernet frames, to which of its five i/o ports P1, P2, P, P4, P5 the Ethernet frame, i.e. the handled data packet, is to be forwarded and then transmitted based on the MAC address of the destination node of the packets; therefore, according to this example, Ethernet frames flows are identified by the destination MAC address.

The state diagram of the procedure of this example comprises six states labeled: "STATE-0", "STATE-1", "STATE-2", "STATE-3", "STATE-4", "STATE-5"; "STATE-0" is considered the "DEFAULT" state and corresponds to the state when the switch SW does not know the correct/best port for the forwarding action; "STATE-1" corresponds to the state when the correct/best port for the forwarding action is port P1; etc.; the action "flood" means forwarding the received Ethernet frames to all the i/o ports of the switch SW.

FIG. 5A shows a flow table FT that is used for implementing the procedure of this example according to the present invention; such flow table is stored into the control plane CPL of the apparatus SW during configuration of the apparatus SW by the network controller NWC.

FIG. 5B shows a state table ST that is used for implementing the procedure of this example according to the present invention as it is at the beginning, i.e. just after configuration of the apparatus SW by the network controller NWC; according to this example, such state table is stored into the control plane CPL of the apparatus SW during configuration of the apparatus SW by the network controller NWC. The table of FIG. 5B means that the switch SW has no knowledge of the population and topology of the network.

At the beginning, an IP packet is received at an i/o port of the apparatus SW; this is an event, i.e. the first event.

Event information EI is provided by the data plane DPL to the control plane CPL; event information EI consists in the packet header of the received Ethernet frame and the port number Pi of the i/o port where the Ethernet frame has been received.

The activities described in the following occur within the control plane CPL.

Key data K1 are extracted from the packet header based on first key information and used to query the state table ST; in this example, the first key information specifies that key data to be extracted from the header of the received Ethernet frame correspond to MACdst (i.e. "destination MAC address").

For example, the key data K1 of the currently handled Ethernet frame is Address_003.

At the beginning, the state table ST contains, for example and as shown in FIG. 5B, only the following row:

| KC | SC |
|---|---|
| * | STATE-0 | wherein "*" is symbol of data that match with any key data.

The state table ST is scanned from top to bottom in order to find the first row that matches with the key data extracted from the just received IP packet. The result of the query, i.e. state data SD, is "STATE-0" as there is only one row and as "*" matches with Address_1.

State data SD are used to query the flow table FT.

Event data ED are extracted from the event information EI and are used to query the flow table FT; in this example, the event data ED is the port # where the currently handled Ethernet frame has been received, for example port P2.

Thus the flow table FT is queried through the state data SD and the event data ED, i.e. it is scanned from top to bottom in order to find the first row that matches with the state data SD and the event data ED.

A match occurs with the seventh row of the flow table FT.

The result of the query, the action information AI is "flood" and the update information UI is "STATE-2".

Based on the action information AI (that is provided by the control plane CPL to the data plane DPL), the received Ethernet frame is flooded, i.e. forwarded to all the i/o ports of the switch SW.

Based on the update information UI the state table ST is updated.

In order to carry out the updating, key data K2 are extracted from the packet header based on second key information; in this example, the second key information specifies that key data to be extracted from the header of the received Ethernet frame correspond to MACsrc (i.e. "source MAC address"); it is to be noted that, according to this example, the first key information is different from the second key information coincide. In this case, the key data K2 of the currently handled Ethernet frame is Address_008.

At this stage a row is added to the state table ST using key data K2, i.e. Address_008, and update information UI, "STATE-2", see below.

| KC | SC |
|---|---|
| Address_008 | STATE-2 |
| * | STATE-0 |

We assume now that an IP packet is received at port P3 coming from a node having MAC address equal to Address_005 and directed to a node having MAC address equal to Address_008.

Key data K1 are extracted from the packet header based on first key information. The extracted key data K1 is Address_008.

The state table ST is queried. i.e. the state table ST is scanned from top to bottom in order to find the first row that matches with the key data extracted from the just received Ethernet frame.

The result of the query, i.e. state data SD, is "STATE-2".

State data SD are used to query the flow table FT.

Event data ED are extracted from the event information EI; in this case, the event data ED is port P3.

Thus the flow table FT is queried through the state data SD and the event data ED, i.e. it is scanned from top to bottom in order to find the first row that matches with the state data SD and the event data ED.

The result of the query, the action information AI is "forward(P2)" and the update information UI is "STATE-3".

Based on the action information AI (that is provided by the control plane CPL to the data plane DPL), the received Ethernet frame is forwarded to port P2 of the switch SW.

Based on the update information UI the state table ST is updated.

In order to carry out the updating, key data K2 are extracted from the packet header based on second key information; in this example, the second key information specifies that key data to be extracted from the header of the received Ethernet frame correspond to MACsrc (i.e. "source MAC address"). In this case, the key data K2 of the currently handled IP packet is Address_005.

At this stage a row is added to the state table ST using key data K2, i.e. Address_005, and update information UI, "STATE-3", see below.

| KC | SC |
|---|---|
| Address_005 | STATE-3 |
| Address_008 | STATE-2 |
| * | STATE-0 | node with MAC address Address_005 may be reached from port P3
node with MAC address Address_008 may be reached from port P2

The handling of further Ethernet frames follow in the same way as described above.

Till now, two IP packets flows have been handled with: one from node with MAC address Address_005, and one from node with MAC address Address_008.

It is apparent that each Ethernet frames flow is dealt with dependently due to the "MAC learning function". In practice, through the combination of the state table ST and the flow table FT a plurality of distinct instances of finite state machine is implemented; in particular, the heart of the finite state machine is the flow table while the state table allows to have a plurality of instances.

The dependence between the handling of Ethernet frames flows is due to the relation between the instances of finite state machine; in fact, an instance of finite state machine causes changes in other instances of finite state machine, in particular updates in the rows of the state table ST relating to other instances of finite state machine.

According to the above description, tables ST and FT are scanned from top to bottom in order to find a match; anyway, it is to be understood that the matching priority may be determined in different ways (see for example OpenFlow).

We claim:

1. An apparatus having a plurality of input/output ports for receiving and transmitting data packets, the apparatus comprising:
a data packets handling circuitry arranged to forward data packets between the input/output ports and an internal apparatus controller arranged to control said data packet handling circuitry, the apparatus having a control port for communication between the internal apparatus controller and an external network controller,
the apparatus controller being arranged to store at least one state transition table to be used for controlling the forwarding of data packets by the data packets handling circuitry, the at least one state transition table corresponding to the combination of a state table and a flow table, and the apparatus controller being arranged to store the state table and the flow table, and the apparatus controller is further arranged to receive the flow table through the control port or to receive the state table through the control port, the state table comprising a key column and a state column, and the apparatus controller is arranged to determine, through the state table, state data based on data in the incoming data packets, the apparatus controller is further arranged to use said at least one state transition table for implementing at least one finite state machine, wherein the apparatus controller is arranged to use said at least one state transition table for handling separately distinct incoming data packets flows through corresponding distinct instances of the finite state machine, wherein the apparatus controller is arranged to receive the at least one state transition table through the control port, and wherein the flow table comprises a state column, an event column, an action column and an update column, and the apparatus controller is arranged to determine, through the flow table, action information and update information based on information on events occurring at the input/output ports and on the state data determined through the state table, the action information relating to forwarding actions to be performed on incoming data packets, and the update information relating to row updates to be performed on data in the state table.

2. The apparatus according to claim 1,
wherein the apparatus controller is arranged to use said at least one state transition table for handling separately distinct incoming data packets flows through corresponding distinct instances of the finite state machine,
wherein the apparatus controller is arranged to handle distinct incoming data packets flows independently or dependently from each other through relations between instances of the finite state machine.

3. The apparatus according to claim 2,
wherein the update information relates to the same instance of the finite state machine.

4. The apparatus according to claim 2,
wherein the apparatus controller is arranged to implement at least one key extraction function.

5. The apparatus according to claim 1,
wherein the update information relates to the same instance of the finite state machine.

6. The apparatus according to claim 5,
wherein the apparatus controller is arranged to implement at least one key extraction function.

7. The apparatus according to claim 2,
wherein the update information relates to a different instance of the finite state machine.

8. The apparatus according to claim 1,
wherein the apparatus controller is arranged to implement at least one key extraction function.

9. The apparatus according to claim 1,
wherein the apparatus controller is arranged to use said at least one state transition table for handling separately distinct incoming data packets flows through corresponding distinct instances of finite state machine,
wherein the apparatus controller is arranged to handle distinct incoming data packets flows independently or dependently from each other through relations between instances of finite state machine, and
wherein the update information relates to the same instance of the finite state machine.

10. The apparatus according to claim 1,
wherein the update information relates to a different instance of the finite state machine.

11. The apparatus according to claim 1,
wherein the apparatus controller is arranged to use said at least one state transition table for handling separately distinct incoming data packets flows through corresponding distinct instances of finite state machine,
wherein the apparatus controller is arranged to handle distinct incoming data packets flows independently or dependently from each other through relations between instances of finite state machine, and
wherein the update information relates to a different instance of the finite state machine.

12. An apparatus having a plurality of input/output ports for receiving and transmitting data packets, the apparatus comprising:
a data packets handling circuitry arranged to forward data packets between the input/output ports and an internal apparatus controller arranged to control said data packet handling circuitry, the apparatus having a control port for communication between the internal apparatus controller and an external network controller,
the apparatus controller being arranged to store at least one state transition table to be used for controlling the forwarding of data packets by the data packets handling circuitry, the at least one state transition table corresponding to the combination of a state table and a flow table, and the apparatus controller being arranged to store the state table and the flow table, and the apparatus controller is further arranged to receive the flow table through the control port or to receive the state table through the control port,
the apparatus controller is further arranged to use said at least one state transition table for implementing at least one finite state machine, and the apparatus controller is additionally arranged to implement at least one key extraction function, one of which is a first key extraction function to data in incoming data packets for the purpose of querying the state table,
wherein the apparatus controller is arranged to use said at least one state transition table for handling separately distinct incoming data packets flows through corresponding distinct instances of a finite state machine, and
wherein the apparatus controller is arranged to receive the at least one state transition table through the control port.

13. The apparatus according to claim 12,
wherein the apparatus controller is arranged to apply a second key extraction function to data in incoming data packets for the purpose of updating the state table.

14. The apparatus according to claim 12,
wherein the apparatus controller is arranged to receive one or two key extraction rules through the control port to be used for the key extraction function or functions.

15. An apparatus having a plurality of input/output ports for receiving and transmitting data packets, the apparatus comprising:
a data packets handling circuitry arranged to forward data packets between the input/output ports and an internal apparatus controller arranged to control said data packet handling circuitry, the apparatus having a control port for communication between the internal apparatus controller and an external network controller,
the apparatus controller being arranged to store at least one state transition table to be used for controlling the forwarding of data packets by the data packets handling circuitry, the at least one state transition table corresponding to the combination of a state table and a flow table, and the apparatus controller being arranged to store the state table and the flow table, and the apparatus controller is further arranged to receive the flow table through the control port or to receive the state table through the control port, the apparatus controller is further arranged to use said at least one state transition table for implementing at least one finite state machine, and the apparatus control is additionally arranged to implement at least one key extraction function, one of which is a second key extraction function to data in incoming data packets for the purpose of updating the state table, wherein the apparatus controller is arranged to use said at least one state transition table for handling separately distinct incoming data packets flows through corresponding distinct instances of a finite state machine, and wherein the apparatus controller is arranged to receive the at least one state transition table through the control port.

16. The apparatus according to claim 15,
wherein the apparatus controller is arranged to receive one or two key extraction rules through the control port to be used for the key extraction function or functions.

17. The apparatus according to claim 15,
wherein the apparatus controller is arranged to receive one or two key extraction rules through the control port to be used for the key extraction function or functions.

18. An apparatus having a plurality of input/output ports for receiving and transmitting data packets, the apparatus comprising:

a data packets handling circuitry arranged to forward data packets between the input/output ports and an internal apparatus controller arranged to control said data packet handling circuitry, the apparatus having a control port for communication between the internal apparatus controller and an external network controller, the apparatus controller being arranged to store at least one state transition table to be used for controlling the forwarding of data packets by the data packets handling circuitry, the at least one state transition table corresponding to the combination of a state table and a flow table, and the apparatus controller being arranged to store the state table and the flow table, and the apparatus controller is further arranged to receive the flow table through the control port or to receive the state table through the control port, the apparatus controller is further arranged to use said at least one state transition table for implementing at least one finite state machine, and the apparatus controller is additionally arranged to implement at least one key extraction function, wherein the apparatus controller is arranged to use said at least one state transition table for handling separately distinct incoming data packets flows through corresponding distinct instances of a finite state machine, wherein the apparatus controller is arranged to receive the at least one state transition table through the control port according to claim, and wherein the apparatus controller is arranged to receive one or two key extraction rules through the control port to be used for the key extraction function or functions.

* * * * *